United States Patent
Kim et al.

(10) Patent No.: US 9,128,265 B2
(45) Date of Patent: Sep. 8, 2015

(54) LENS ASSEMBLY AND OPTICAL SYSTEM INCLUDING THE SAME

(71) Applicant: Kolen Co., Ltd., Gyeonggi-do (KR)

(72) Inventors: Ji Eun Kim, Gyeonggi-do (KR); Pil Sun Jung, Gyeonggi-do (KR); Chi Ho Ahn, Gyeonggi-do (KR); Jae Hoon Cho, Gyeonggi-do (KR); Yang Hee Han, Jeollanam-do (KR)

(73) Assignee: Kolen Co., Ltd., Gyeonggi-do (KR)

( * ) Notice: Subject to any disclaimer, the term of this patent is extended or adjusted under 35 U.S.C. 154(b) by 143 days.

(21) Appl. No.: 14/018,096

(22) Filed: Sep. 4, 2013

(65) Prior Publication Data
US 2014/0063625 A1    Mar. 6, 2014

(30) Foreign Application Priority Data

Sep. 5, 2012    (KR) .......................... 10-2012-0098483

(51) Int. Cl.
| | |
|---|---|
| *G02B 9/08* | (2006.01) |
| *G02B 7/02* | (2006.01) |
| *G02B 13/00* | (2006.01) |
| *G02B 7/00* | (2006.01) |
| *G02B 5/00* | (2006.01) |

(52) U.S. Cl.
CPC .......... *G02B 13/0015* (2013.01); *G02B 13/003* (2013.01); *G02B 13/0035* (2013.01); *G02B 5/005* (2013.01); *G02B 7/003* (2013.01); *G02B 7/02* (2013.01); *G02B 7/021* (2013.01); *G02B 7/022* (2013.01)

(58) Field of Classification Search
CPC .......... G02B 7/02; G02B 7/021; G02B 7/022; G02B 7/003; G02B 5/005
USPC .................. 359/739, 740, 811, 819, 827, 829
See application file for complete search history.

(56) References Cited

U.S. PATENT DOCUMENTS

| | | | | |
|---|---|---|---|---|
| 7,639,438 B2 * | 12/2009 | Chen | ............................ | 359/819 |
| 7,755,858 B2 * | 7/2010 | Chen | ............................ | 359/819 |

FOREIGN PATENT DOCUMENTS

| | | |
|---|---|---|
| JP | 2002-196211 A | 7/2002 |
| JP | 2005-258329 A | 9/2005 |
| JP | 2009-048024 A | 3/2009 |
| KR | 10-2010-0030523 A | 3/2010 |

OTHER PUBLICATIONS

Notice of Non-Final Rejection issued by Korean Intellectual Property Office for priority application No. 10-2012-0098483 dated Oct. 28, 2013 with English translation.

\* cited by examiner

*Primary Examiner* — Evelyn A Lester
(74) *Attorney, Agent, or Firm* — Frommer Lawrence & Haug LLP (57) ABSTRACT

Provided are a lens assembly and an optical system including the same. The lens assembly may include a first lens having a groove region, a second lens having an insertion region that is inserted into the groove region, and a light blocking member between the first lens and the second lens. The light blocking member may be disposed between a first surface portion of the first lens and a second surface portion of the second lens, and the light blocking member may be separated from at least one of the first surface portion and the second surface portion. The lens assembly may further include at least one additional lens. The lens assembly may be applied to various optical systems.

16 Claims, 7 Drawing Sheets

LENS ASSEMBLY AND OPTICAL SYSTEM INCLUDING THE SAME

CROSS-REFERENCE TO RELATED PATENT APPLICATION

This application claims the benefit of Korean Patent Application No. 10-2012-0098483, filed on Sep. 5, 2012, in the Korean Intellectual Property Office, the disclosure of which is incorporated herein in its entirety by reference.

BACKGROUND

1. Field

The present invention relates to an optical device, and more particularly, to a lens assembly and an optical system including the same.

2. Description of the Related Art

Lens assemblies used in optical devices, in particular, lens assemblies used in mobile phones, digital cameras, or the like, are required to be precisely manufactured in order to secure high resolution thereof. As cameras become smaller in size and as pixel integration of solid imaging devices increases, the performance improvement and precision management of the lens assemblies become more important.

In general, lens assemblies are manufactured by inserting a plurality of unit lenses into a lens barrel. At this time, central axes (the arrangement) of the unit lenses are determined according to the concentricity and precision of the lens barrel. However, the concentricity, flatness, or the like of the lens barrel is not relatively precise (in general, the concentricity and flatness of the lens barrel is equal to or less than 10 μm), and thus, there is a high possibility that the central axes of the unit lenses are not consistent with each other. Thus, a decenter problem occurs, which results in a deterioration of the performance and resolution of a camera. As the number of pixels of a camera increases and as the size of a lens assembly decreases, problems due to the decenter may become more serious.

Figure 1:
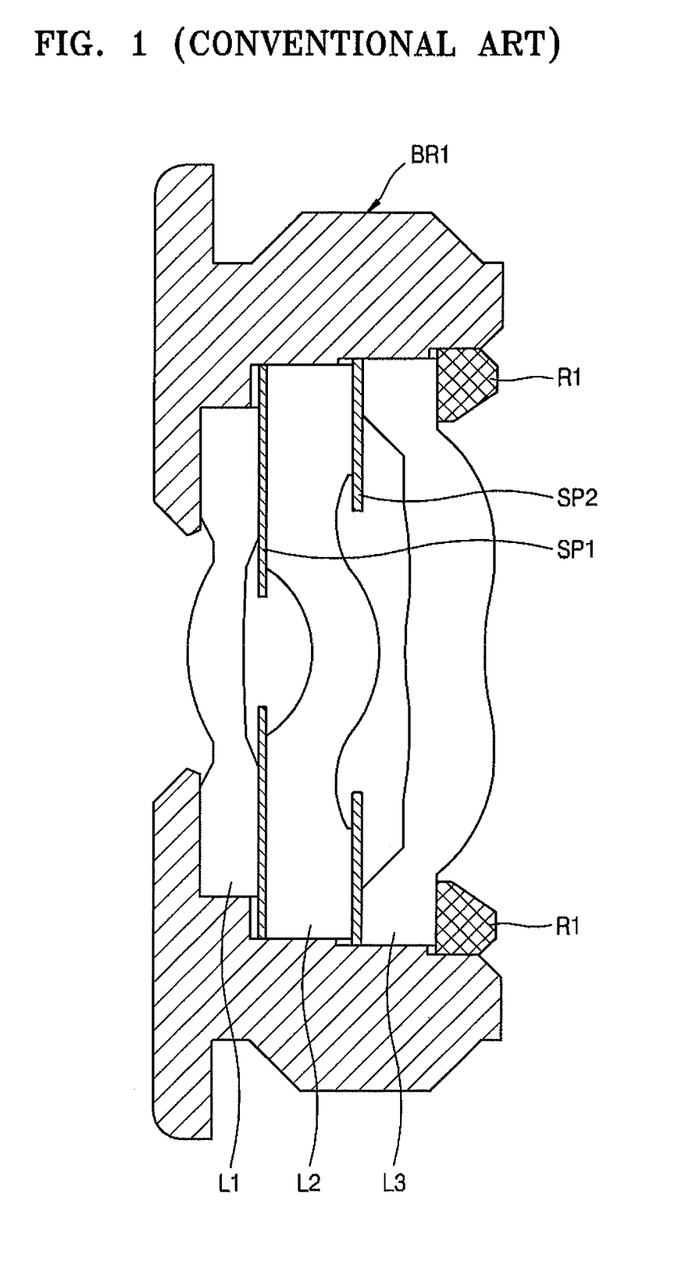
FIG. 1 is a cross-sectional view illustrating a lens assembly according to the related art.

FIG. 1 is a cross-sectional view illustrating a lens assembly according to the related art.

Referring to FIG. 1, a first lens L1, a second lens L2, and a third lens L3 are inserted into a lens barrel BR1. A valid lens region serving as an actual lens exists at the center of each of the first lens L1, the second lens L2, and the third lens L3, and a flange part exists at an edge of each of them. Both surfaces of the flange part are flat. A first spacer SP1 is provided between the flange part of the first lens L1 and the flange part of the second lens L2, and a second spacer SP2 is provided between the flange part of the second lens L2 and the flange part of the third lens L3. Both surfaces of the first spacer SP1 come into close contact with the flange parts of the first lens L1 and the second lens L2. Similarly, both surfaces of the second spacer SP2 come into close contact with the flange parts of the second lens L2 and the third lens L3. The first lens L1, the second lens L2, and the third lens L3 are fitted into grooves provided in the lens barrel BR1, respectively, and a back ring R1 is finally fitted into and attached to an inlet of the lens barrel BR1 so as to fix the first lens L1, the second lens L2, and the third lens L3.

In the structure shown in FIG. 1, the central axes (the arrangement) of the unit lenses L1, L2, and L3 are greatly influenced by the concentricity, precision, or the like of the lens barrel BR1. Therefore, when the lens barrel BR1 is not precisely manufactured, a decenter problem wherein the central axes of the unit lenses L1, L2, and L3 are not consistent with each other may occur.

SUMMARY

The present invention provides lens assemblies capable of suppressing/preventing a decenter problem and optical systems including the lens assemblies.

The present invention also provides lens assemblies that may improve the performance and resolution of a camera, and optical systems including the lens assemblies.

According to an aspect of the present invention, there is provided an optical system that comprises a lens assembly comprising at least two lenses, the lens assembly comprising: a first lens having a groove region; a second lens having an insertion region that is inserted into the groove region; and a light blocking member that is disposed between the first lens and the second lens and has an opening corresponding to an optical axis of the lens assembly. The light blocking member is disposed between a first surface portion of the first lens and a second surface portion of the second lens, and the light blocking member is separated from at least one of the first surface portion and the second surface portion.

The light blocking member may be disposed between the groove region and the insertion region.

The first lens may include the first surface portion in the groove region, and the second surface portion in the insertion region.

An inner side surface of the groove region may have a first inclined surface that is inclined with respect to the optical axis so that a width of the groove region increases toward the second lens.

An outer side surface of the insertion region may have a second inclined surface corresponding to the first inclined surface of the groove region, and the second inclined surface may come into contact with the first inclined surface.

An inner side surface of the groove region and an outer side surface of the insertion region may be parallel to the optical axis.

The groove region may be formed in an annular shape in an outer circumferential portion of the first lens, and the insertion region may have an annular shape corresponding to the groove region. In this case, an end surface of the insertion region may come into close contact with a bottom of the groove region. The first lens may have the first surface portion on an inner side with respect to the groove region, and the second lens may have the second surface portion on an inner side with respect to the insertion region. An outer diameter of the light blocking member may correspond to an inner diameter of the insertion region.

The groove region may be a first groove region, the first lens further includes a second groove region, and the light blocking member may be disposed in the second groove region. An outer diameter of the second groove region may be smaller than an outer diameter of the first groove region.

The entirety of the second lens may be inserted into the groove region of the first lens. The groove region may be a first groove region, the first lens may further include a second groove region within the first groove region, and the light blocking member is disposed in the second groove region. The second lens may further include a protrusion portion that is inserted into the second groove region.

The lens assembly may further include a third lens

The third lens may be coupled to the first lens or the second lens.

The first lens or the second lens may include a second groove region, and the third lens may include a second insertion region that is inserted into the second groove region.

The third lens may include a second groove region, and the first lens or the second lens may include a second insertion region that is inserted into the second groove region.

The lens assembly may further include a second light blocking member that is disposed between the third lens and one of the first and second lenses.

The second light blocking member may be disposed between a third surface portion of one of the first and second lenses and a fourth surface portion of the third lens, and the second light blocking member may be separated from at least one of the third and fourth surface portions.

The lens assembly may further include at least one other lens.

The entirety of at least one of both surfaces of the light blocking member may be separated from the first surface portion and the second surface portion.

According to another aspect of the present invention, there is provided an optical system that includes a lens assembly comprising at least two lenses, the lens assembly comprising: a first lens having a groove region; a second lens having an insertion region that is inserted into the groove region; and a light blocking member that is disposed between the first lens and the second lens and has an opening corresponding to on an optical axis, wherein an inner side surface of the groove region has a inclined surface that is inclined with respect to the optical axis, wherein an outer side surface of the insertion region has a second inclined surface contacting the first inclined surface, and wherein the light blocking member is located between the groove region and the insertion region.

An interval between the groove region and the insertion region may be greater than a thickness of the light blocking member.

BRIEF DESCRIPTION OF THE DRAWINGS

The above, and other features, and advantages of the present invention will become more apparent by describing in detail exemplary embodiments thereof with reference to the attached drawings in which.

DETAILED DESCRIPTION

Hereinafter, lens assemblies according to embodiments of the present invention and optical systems including the same will be described in detail with reference to the accompanying drawings. Like reference numerals designate like (or similar) elements throughout the specification. Expressions such as "at least one of," when preceding a list of elements, modify the entire list of elements and do not modify the individual elements of the list.

Figure 2:
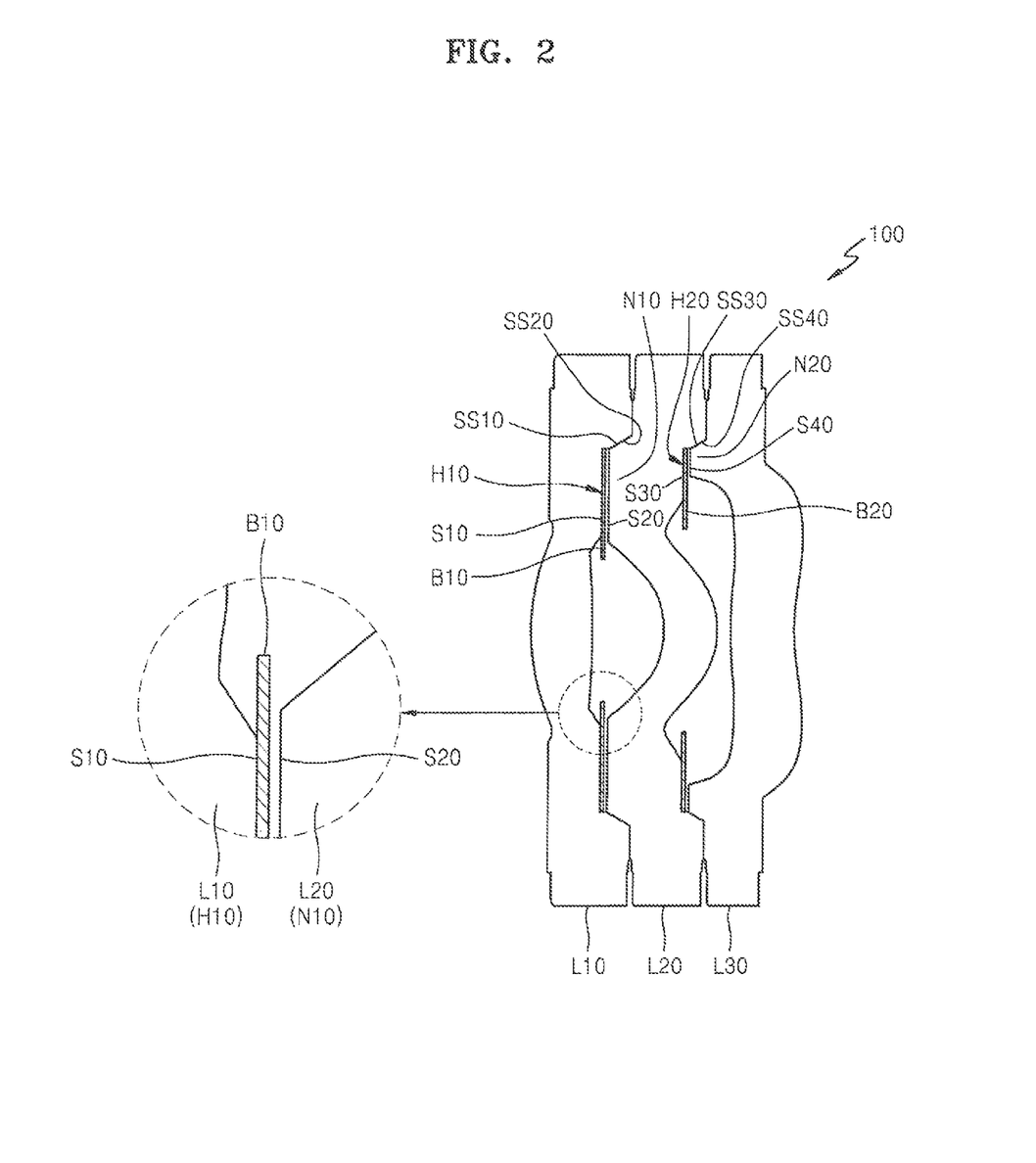
FIG. 2 is a cross-sectional view illustrating a lens assembly according to an embodiment of the present invention.

FIG. 2 is a cross-sectional view illustrating a lens assembly 100 according to an embodiment of the present invention.

Referring to FIG. 2, the lens assembly 100 may include a plurality of lenses, for example, a first lens L10, a second lens L20, and a third lens L30. The first lens L10 may include a first groove region H10, and the second lens L20 may include a first insertion region N10 to be inserted into the first groove region H10. The second lens L20 and the first lens L10 may be coupled to each other by inserting the first insertion region N10 of the second lens L20 into the first groove region H10 of the first lens L10. In other words, the second lens L20 and the first lens L10 may be coupled to each other by inserting a part of the second lens L20, that is, the first insertion region N10, into the first groove region H10 of the first lens L10.

The first lens L10 may have a first surface portion S10 in the first groove region H10 thereof, and the second lens L20 may have a second surface portion S20 in the first insertion region N10 thereof. The first surface portion S10 and the second surface portion S20 may be outside of a valid region (center portion), and may be flat surfaces. The first surface portion S10 and the second surface portion S20 may be separated from each other. Thus, a predetermined space may be provided between the first surface portion S10 and the second surface portion S20.

A first light blocking member B10 having an opening corresponding to on an optical axis of the lens assembly 100 may be disposed between the first surface portion S10 and the second surface portion S20. A central portion of the opening may be on the optical axis or adjacent to the optical axis. The first light blocking member B10 may be separated from at least one of the first surface portion S10 and the second surface portion S20. For example, as illustrated in FIG. 2, the first light blocking member B10 may be separated from the second surface portion S20 and may come into contact with the first surface portion S10. However, the first light blocking member B10 may be separated from the first surface portion S10 and may come into contact with the second surface portion S20, or may be separated from both the first and second surface portions S10 and S20. The entirety of at least one of both surfaces of the first light blocking member B10 may be separated from the first surface portion S10 and the second surface portion S20. FIG. 2 illustrates a case where the entirety of the right surface of the both surfaces of the first light blocking member B10 is separated from the first surface portion S10 and the second surface portion S20.

An inner side surface of the first groove region H10 of the first lens L10 may have a first inclined surface SS10 that is inclined with respect to the optical axis. A width (diameter) of the first groove region H10 may increase toward the second lens L20 by the first inclined surface SS10. An outer side surface of the insertion region N10 of the second lens L20 may have a second inclined surface SS20 corresponding to the first inclined surface SS10. The second inclined surface SS20 may come into contact with the first inclined surface SS10. As stated above, since the first and second inclined surfaces SS10 and SS20 come into contact with each other and are separated from the first surface portion S10, a predetermined space may be provided between the first groove region H10 and the first insertion region N10, and the first light blocking member B10 may be disposed in the predetermined space.

The lens assembly 100 may further include the third lens L30 that is coupled to the second lens L20. A method of coupling the second lens L20 and the third lens L30 to each other may be similar to that a method of coupling the first lens L10 and the second lens L20 to each other. That is, a second groove region H20 may be included in the second lens L20, a second insertion region N20 may be included in the third lens L30, and the second insertion region N20 may be inserted into the second groove region H20. A third inclined surface SS30 may be included in an inner side surface of the second groove region H20, a fourth inclined surface SS40 may be included in an outer side surface of the second insertion region N20, and the third inclined surface SS30 and the fourth inclined surface SS40 may come into contact with each other.

The second lens L20 may include a third surface portion S30 in the second groove region H20 thereof, and the third lens L30 may include a fourth surface portion S40 in the second insertion region N20 thereof. The third surface portion S30 and the fourth surface portion S40 may be separated from each other. A second light blocking member B20 having an opening corresponding to the optical axis may be disposed between the third surface portion S30 and the fourth surface portion S40. The second light blocking member B20 may be separated from at least one of the third surface portion S30 and the fourth surface portion S40. For example, as illustrated in FIG. 2, the second light blocking member B20 may be separated from the fourth surface portion S40, and may come into contact with the third surface portion S30. However, this is just an example. Under different conditions, the second light blocking member B20 may be separated from the third surface portion S30 and may come into contact with the fourth surface portion S40, or may be separated from both the third and fourth surface portions S30 and S40.

Although not shown in the drawing, a fourth lens that is coupled to the third lens L30 may further be included. A method of coupling the third lens L30 and the fourth lens (not shown) to each other may be similar to a method of coupling the second lens L20 and the third lens L30 to each other. The lens assembly 100 may further include one or more additional lenses, in addition to the fourth lens.

Figure 3:
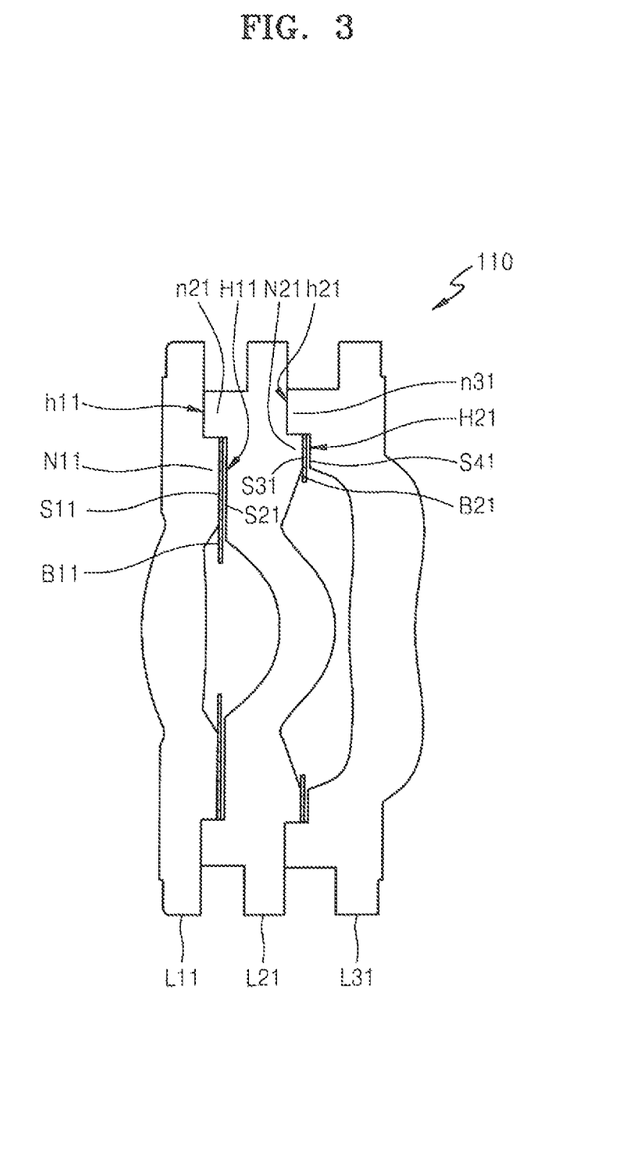
FIG. 3 is a cross-sectional view illustrating a lens assembly according to another embodiment of the present invention.

FIG. 3 is a cross-sectional view illustrating a lens assembly 110 according to another embodiment of the present invention.

Referring to FIG. 3, the lens assembly 110 may include a first lens L11, a second lens L21, and a third lens L31. The first lens L11 may have a first insertion region (protrusion region) N11. The second lens L21 may have a first groove region H11 into which the first insertion region N11 is inserted. The first groove region H11 may have a shape corresponding to the first insertion region N11. The first lens L11 and the second lens L21 may be coupled to each other by inserting the first insertion region N11 into the first groove region H11.

The first lens L11 may include a first surface portion S11 in the first insertion region N11 thereof, and the second lens L21 may include a second surface portion S21 in the first groove region H11 thereof. The first surface portion S11 and the second surface portion S21 may be present outside of valid regions (central portions) of the first lens L11 and the second lens L21, and may be flat surfaces.

The first surface portion S11 and the second surface portion S21 may be separated from each other. Thus, a predetermined space may be provided between the first surface portion S11 and the second surface portion S21.

A first light blocking member B11 having an opening corresponding to the optical axis of the lens assembly 110 may be disposed between the first surface portion S11 and the second surface portion S21. The first light blocking member B11 may be separated from at least one of the first surface portion S11 and the second surface portion S21. For example, as illustrated in FIG. 3, the first light blocking member B11 may be separated from the second surface portion S21, and may come into contact with the first surface portion S11. However, the first light blocking member B11 may be separated from the first surface portion S11 and may come into contact with the second surface portion S21, or may be separated from both the first and second surface portions S11 and S21. The entirety of at least one of both surfaces of the first light blocking member B11 may be separated from the first surface portion S11 and the second surface portion S21. FIG. 3 illustrates a case where the entirety of the right surface of the both surfaces of the first light blocking member B11 is separated from the first surface portion S11 and the second surface portion S21.

An outer side surface of the first insertion region N11 may be parallel to the optical axis of the lens assembly 110. In addition, an inner side surface of the first groove region H11 may be parallel to the optical axis of the lens assembly 110. In other words, the outer side surface of the first insertion region N11 may be perpendicular to the first lens L11, and the inner side surface of the first groove region H11 may be perpendicular to the second lens L21. A groove h11 may be formed on an outer side with respect to the first insertion region N11 of the first lens L11, and a protrusion portion n21 may be formed on an outer side with respect to the first groove region H11 of the second lens L21. The protrusion portion n21 may come into close contact with the bottom (bottom perpendicular to the optical axis) of the groove h11. The shapes of the groove h11 and the protrusion portion n21 are exemplary, and may be modified in various ways.

In the current embodiment, the first surface portion S11 of the first insertion region N11 and the second surface portion S21 of the first groove region H11 are separated from each other because the length of the first insertion region N11 is shorter than the depth of the first groove region H11. At this time, a reference for measuring the length of the first insertion region N11 and the depth of the first groove region H11 may be a line (level) corresponding to the bottom (the bottom perpendicular to the optical axis) of the groove h11.

The third lens L31 coupled to the second lens L21 may further be included. A method of coupling the second lens L21 to the third lens L31 may be similar to a method of coupling the first lens L11 to the second lens L21. For this, a second insertion region N21 may be provided in the second lens L21, a second groove region H21 may be provided in the third lens L31, and the second insertion region N21 may be inserted into the second groove region H21. As a distance between the second insertion region N21 and the second groove region H21 decreases, the second lens L21 and the third lens L31 may be coupled to each other.

The second lens L21 may include a third surface portion S31 in the second insertion region N21 thereof, and the third lens L31 may include a fourth surface portion S41 in the second groove region H21 thereof. The third surface portion S31 and the fourth surface portion S41 may be separated from each other. A second light blocking member B21 having an opening according to the optical axis of the lens assembly 110 may be disposed between the third surface portion S31 and the fourth surface portion S41. The second light blocking member B21 may be separated from at least one of the third surface portion S31 and the fourth surface portion S41. For example, as shown in FIG. 3, the second light blocking member B21 may be separated from the fourth surface portion S41 and may come into contact with the third surface portion S31. Under different conditions, the second light blocking member B21 may be separated from the third surface portion S31 and may come into contact with the fourth surface portion S41, or may be separated from both the third and fourth surface portions S31 and S41.

An outer side surface of the second insertion region N21 may be parallel to the optical axis. An inner side surface of the second groove region H21 may be parallel to the optical axis. In other words, the outer side surface of the second insertion region N21 may be perpendicular to the second lens L21, and the inner side surface of the second groove region H21 may be perpendicular to the third lens L31. A groove h21 may be formed on an outer side with respect to the second insertion region N21 of the second lens L21, and a protrusion portion n31 may be formed on an outer side with respect to the second groove region H21 of the third lens L31. The protrusion portion n31 may come into close contact with the bottom (the bottom perpendicular to the optical axis) of the groove h21. The shapes of the groove h21 and the protrusion portion n31 are exemplary, and may be modified in various ways.

Although not shown in the drawing, a fourth lens coupled to the third lens L31 may further be included. A method of coupling the third lens L31 and the fourth lens (not shown) to each other may be similar to a method of coupling the second lens L21 and third lens L31 to each other. The lens assembly 110 may further include one or more additional lenses, in addition to the fourth lens.

In FIG. 3, the reference numerals of the lenses L11, L21, and L31 are arbitrarily determined, and may vary. The lens L21 that is located in the middle may be referred to as a "first lens", the lens L11 that is located on the left side of the lens L21 may be referred to as a "second lens", and the lens L31 that is located on the right side of the lens L21 may be referred to as a "third lens". Alternatively, the lens L21 that is located in the middle may be referred to as a "first lens", the lens L31 that is located on the right side of the lens L21 may be referred to as a "second lens", and the lens L11 that is located on the left side of the lens L21 may be referred to as a "third lens". Alternatively, the lenses may be referred to as a first lens, a second lens, and a third lens when considered from right to left.

Figure 4:
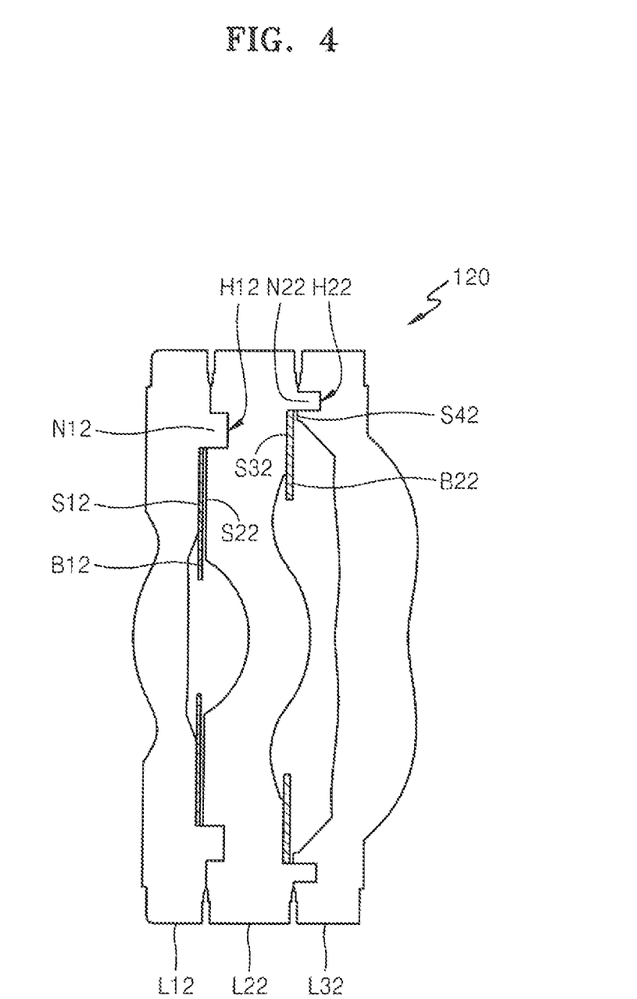
FIG. 4 is a cross-sectional view illustrating a lens assembly according to another embodiment of the present invention.

FIG. 4 is a cross-sectional view illustrating a lens assembly 120 according to another embodiment of the present invention.

Referring to FIG. 4, the lens assembly 120 may include a first lens L12, a second lens L22, and a third lens L32. The first lens L12 may have a first insertion region (protrusion region) N12 that is formed in an annular shape along the outer circumferential portion thereof. The second lens L22 may have a first groove region H12 that is formed in an annular shape along the outer circumferential portion thereof. The first groove region H12 may have a shape corresponding to the first insertion region N12. The first groove region H12 may be completely filled by the first insertion region N12. The first lens L12 and the second lens L22 may be coupled to each other by fitting the first insertion region N12 into the first groove region H12.

The first lens L12 may include a first surface portion S12 on an inner side (that is, the inside) with respect to the first insertion region N12, and the second lens L22 may include a second surface portion S22 on an inner side (that is, the inside) with respect to the first groove region H12. The first and second surface portions S12 and S22 may be outside of valid regions (central portions), and may be flat surfaces. The first surface portion S12 and the second surface portion S22 may be separated from each other. In other words, the first lens L12 and the second lens L22 may be separated from each other on the inner side of the first insertion region N12. A straight distance between a line corresponding to an end surface of the first insertion region N12 and the first surface portion S12 may be longer than a straight distance between the line corresponding to the end surface of the first insertion region N12 and the second surface portion S22. Thus, a predetermined space may be provided between the first surface portion S12 and the second surface portion S22. A first light blocking member B12 may be disposed between the first surface portion S12 and the second surface portion S22. The first light blocking member B12 may be separated from at least one of the first surface portion S12 and the second surface portion S22. For example, as illustrated in FIG. 4, the first light blocking member B12 may be separated from the second surface portion S22, and may come into contact with the first surface portion S12. However, under different conditions, the first light blocking member B12 may be separated from the first surface portion S12 and may come into contact with the second surface portion S22, or may be separated from both the first and second surface portions S12 and S22. In the current embodiment, an outer diameter of the first light blocking member B12 may correspond to an inner diameter of the first insertion region N12. In other words, an edge (an outer side surface) of the first light blocking member B12 may come into contact with an inner side surface of the first insertion region N12.

In the current embodiment, it may be considered that an "inner groove region" is provided in a portion of the first lens L12 on the inner side with respect to the first insertion region N12, an "inner insertion region" is provided in a portion of the second lens L22 on the inner side with respect to the first groove region H12, and the inner insertion region is inserted into the inner groove region. In addition, the first surface portion S12 may be regarded as a surface (bottom) of the inner groove region, and the second surface portion S22 may be regarded as a surface (end surface) of the inner insertion region.

The third lens L32 coupled to the second lens L22 may further be included. A method of coupling the third lens L32 and the second lens L22 to each other may be similar to a method of coupling the first lens L12 and the second lens L22 to each other. For this, a second groove region H22 may be provided in the third lens L32, a second insertion region N22 may be provided in the second lens L22, and the second insertion region N22 may be inserted into the second groove region H22. The second groove region H22 may have an annular shape, and the second insertion region N22 may have a shape corresponding to the second groove region H22. The second lens L22 and the third lens L32 may be coupled to each other by fitting the insertion region N22 into the second groove region H22.

The second lens L22 and the third lens L32 may be separated from each other on the inner side with respect to the second insertion region N22. The second lens L22 may have a third surface portion S32 on the inner side (that is, the inside) with respect to the second insertion region N22, and the third lens L32 may have a fourth surface portion S42 on the inner side (that is, the inside) with respect to the second groove region H22. The third surface portion S32 and the fourth surface portion S42 may be separated from each other. A second light blocking member B22 may be disposed between the third surface portion S32 and the fourth surface portion S42. The second light blocking member B22 may be separated from at least one of the third surface portion S32 and the fourth surface portion S42. For example, as illustrated in FIG. 4, the second light blocking member B22 may be separated from the fourth surface portion S42 and may come into contact with the third surface portion S32. However, under different conditions, the second light blocking member B22 may be separated from the third surface portion S32 and may come into contact with the fourth surface portion S42, or may be separated from both the third and fourth surface portions S32 and S42. An outer diameter of the second light blocking member B22 may correspond to an inner diameter of the second insertion region N22.

In FIG. 4, the reference numerals of the lenses L12, L22, and L32 are arbitrarily denoted and may vary. The lens L22 that is located in the middle may be referred to as a "first lens", the lens L12 that is located on the left side of the lens L22 may be referred to as a "second lens", and the lens L32 that is located on the right side of the lens L22 may be referred to as a "third lens". Alternatively, the lens L22 that is located in the middle may be referred to as a "first lens", the lens L32 that is located on the right side of the lens L22 may be referred to as a "second lens", and the lens L12 that is located on the left side of the lens 122 may be referred to as a "third lens". Alternatively, the lenses may be referred to as a first lens, a second lens, and a third lens when considered from the right to left.

Figure 5:
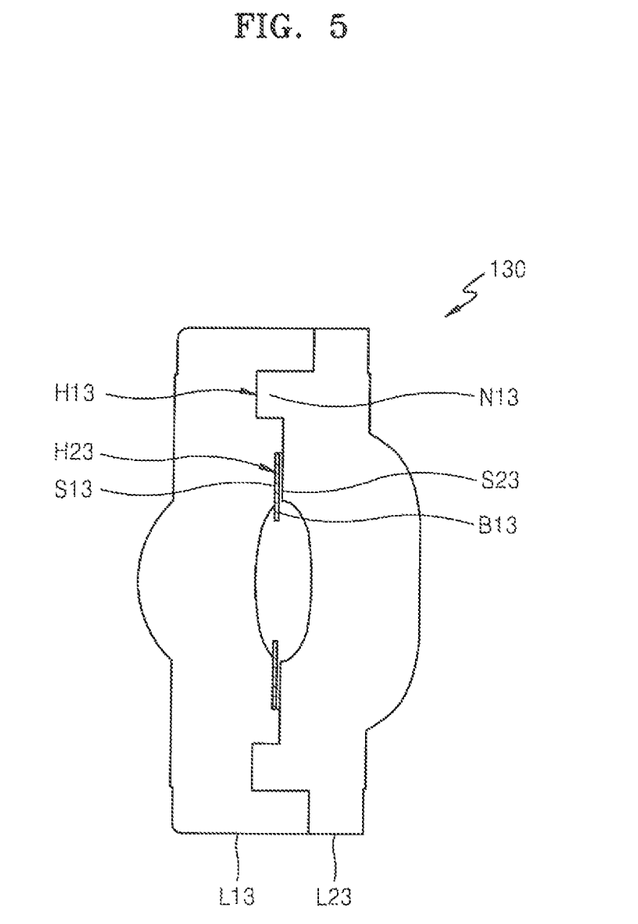
FIG. 5 is a cross-sectional view illustrating a lens assembly according to another embodiment of the present invention.

FIG. 5 is a cross-sectional view illustrating a lens assembly 130 according to another embodiment of the present invention.

Referring to FIG. 5, the lens assembly 130 may include a plurality of lenses, for example, a first lens L13 and a second lens L23. The first lens L13 may have a first groove region H13 that is formed in an annular shape along the outer circumferential portion thereof. The second lens L23 may have a first insertion region N13 that is inserted into the first groove region H13. The first insertion region N13 may have a shape corresponding to the first groove region H13. The first groove region H13 may be completely filled by the first insertion region N13. The first lens L13 may further include a second groove region H23 that is formed on the inner side with respect to the first groove region H13. Thus, an outer diameter of the second groove region H23 may be smaller than an inner diameter of the first groove region H13.

The first lens L13 and the second lens L23 may be separated from each other in the second groove region H23. A light blocking member B13 may be disposed in the second groove region H23. The first lens L13 may have a first surface portion S13 in the second groove region H23 thereof, the second lens L23 may have a second surface portion S23 facing to the first surface portion S13, and the light blocking member B13 may be disposed between the first surface portion S13 and the second surface portion S23. The light blocking member B13 may be separated from at least one of the first surface portion S13 and the second surface portion S23. For example, as illustrated in FIG. 5, the light blocking member B13 may be separated from the second surface portion S23, and may come into contact with the first surface portion S13. However, under different conditions, the light blocking member B13 may be separated from the first surface portion S13 and may come into contact with the second surface portion S23, and may be separated from both the first and second surface portions S13 and S23.

Figure 6:
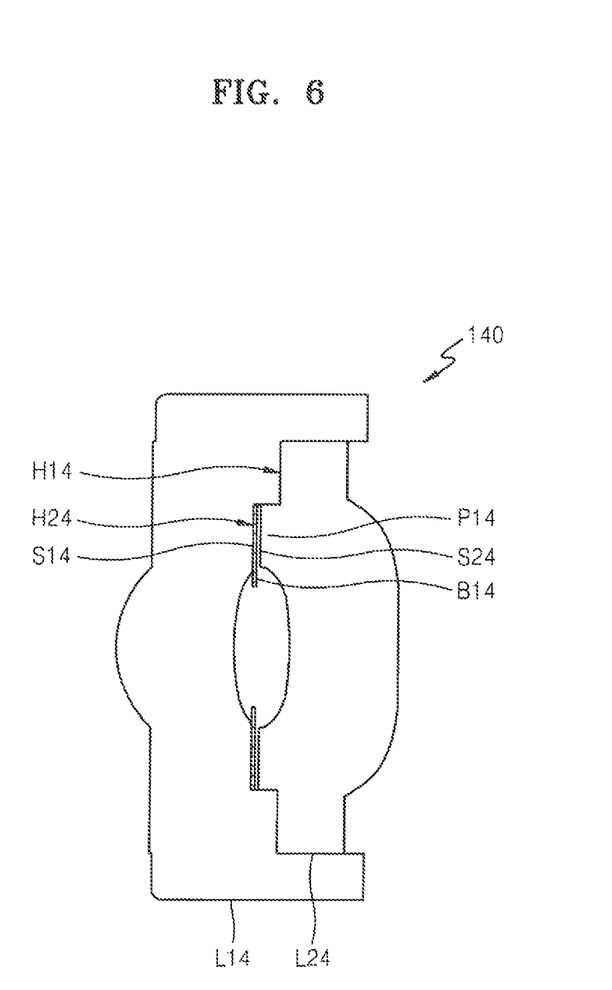
FIG. 6 is a cross-sectional view illustrating a lens assembly according to another embodiment of the present invention.

FIG. 6 is a cross-sectional view illustrating a lens assembly 140 according to another embodiment of the present invention.

Referring to FIG. 6, the lens assembly 140 may include a plurality of lenses, for example, a first lens L14 and a second lens L24. The first lens L14 may have a first groove region H14, and the entirety of the second lens L24 may be inserted into the first groove region H14. In this regard, the entirety of the second lens L24 may be regarded as an "insertion region". The first lens L14 may further include a second groove region H24 that is provided within the first groove region H14. Thus, it may be said that the first lens L14 has a multiple groove structure (for example, a double groove structure) on the outer side of a valid region (central portion). The second lens L24 may have a protrusion portion P14 that is inserted into the second groove region H24. A surface portion (that is, a first surface portion S14) of the second groove region H24 may be separated from a surface portion (that is, a second surface portion S24) of an end portion of the protrusion portion P14. A light blocking member B14 may be disposed in the second groove region H24. In other words, the light blocking member B14 may be disposed between the first surface portion S14 and the second surface portion S24. The light blocking member B14 may be separated from at least one of the first surface portion S14 and the second surface portion S24. For example, as illustrated in FIG. 6, the light blocking member B14 may be separated from the second surface portion S24 and may come into contact with the first surface portion S14. However, under different conditions, the light blocking member B14 may be separated from the first surface portion S14 and may come into contact with the second surface portion S24, or may be separated from both the first and second surface portions S14 and S24.

In addition, at least one of the light blocking members B10 to B14 and B20 to B22 of FIG. 2 to FIG. 6 may be used as an aperture. Alternatively, an aperture may further be included, aside from the light blocking members B10 to B14 and B20 to B22.

Figure 7:
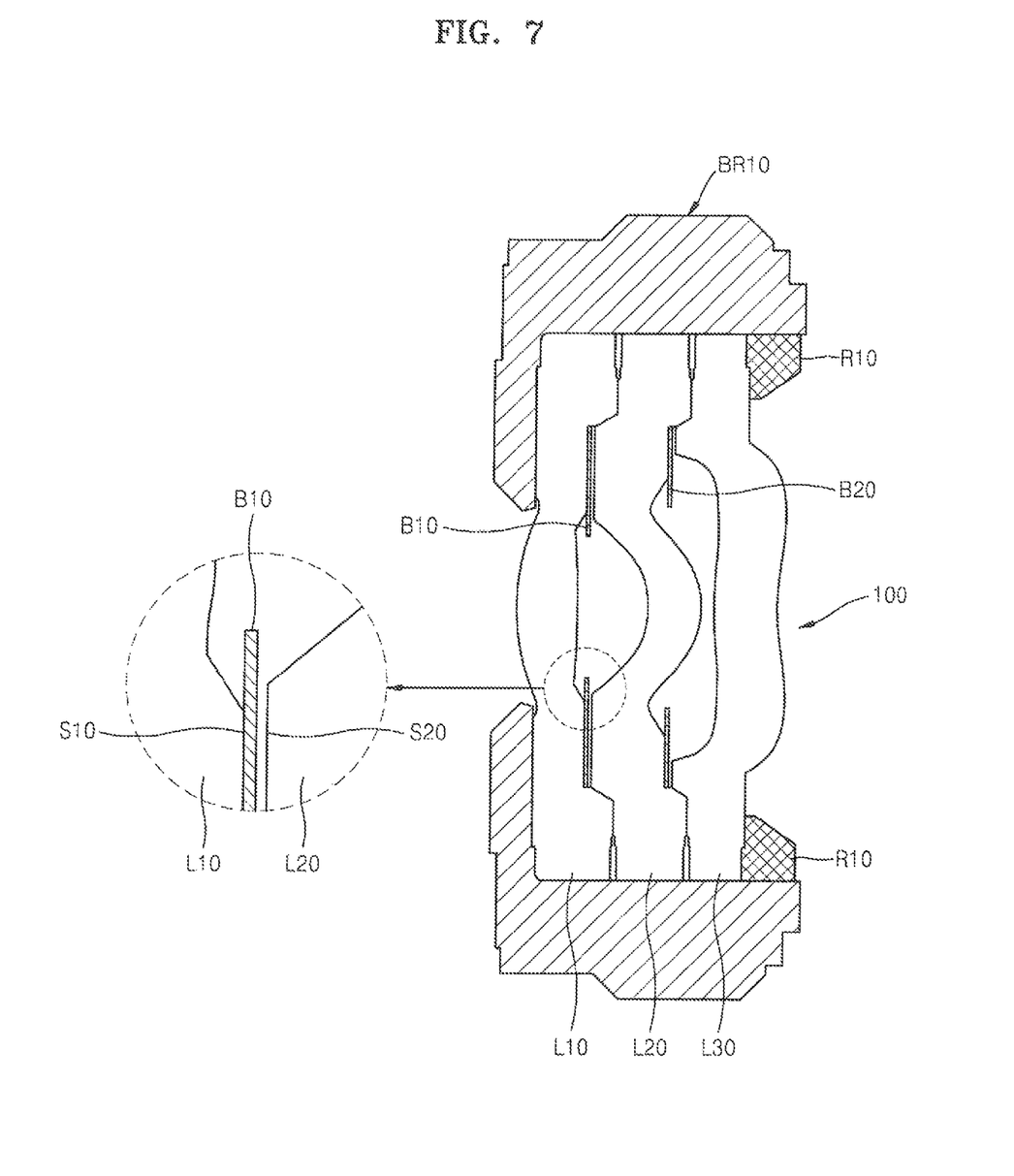
FIG. 7 is a cross-sectional view illustrating a case of inserting the lens assembly according to the embodiment of the present invention into a lens barrel.

FIG. 7 is a cross-sectional view illustrating a case of inserting the lens assembly 100 according to the embodiment of the present invention into a lens barrel BR10. In the current embodiment, the lens assembly 100 has the configuration of FIG. 2.

Referring to FIG. 7, the lens assembly 100 is inserted into the lens barrel BR10. In order to fix the lens assembly 100, a back ring R10 may be fitted into an inlet of the lens barrel BR10 and may be attached thereto. In the embodiments of the present invention, an outer surface (circumferential surface) of the lens assembly 100 may be flat (even) instead of being uneven (as illustrated in FIG. 1). In other words, outer diameters of the first to third lenses L10, L20, and L30 that constitute the lens assembly 100 may be uniform. Thus, the manufacture of the lens barrel BR10 may be facilitated, and the insertion of the lens assembly 100 into the lens barrel BR10 may also be facilitated. In the embodiments of the present invention, the central axes (or arrangement) of the first to third lenses L10, L20, and L30 may depend on the grooves and the insertion regions which are formed in the first to third lenses L10, L20, and L30, instead of depending on the lens barrel BR10. Since the precision arrangement (control) of the first to third lenses L10, L20, and L30 is relatively rigorous (in general, a lens has precision of equal to or less than 3 μm), if the central axes of the first to third lenses L10, L20, and L30 are set by the grooves and the insertion regions formed in the first to third lenses L10, L20, and L30, it is possible to prevent or minimize a decenter problem in which the central axes deviate from each other. Therefore, according to the embodiments of the present invention, the performance and resolution of the lens assembly and an optical system including the same may be improved. In particular, as the number of pixels of a camera increases and as the size of the lens assembly decreases, a structure of the lens assembly according to the embodiments of the present invention may be advantageously used. In addition, in the embodiments of the present invention, since the light blocking member B10 or B20 is separated from at least one of lens surface portions (the first and second surface portions S10 and S20 or the third and fourth surface portions S30 and S40 of FIG. 2) on both sides thereof, the lens assembly may be easily designed, and an interval between lenses may also be easily adjusted. For example, an interval between lenses may be easily controlled, regardless of the lens barrel BR10 or the light blocking members B10 and B20, and an optical axis deviation and a tilt may be easily corrected, as compared with the related art.

Although FIG. 7 illustrates a case where the lens assembly 100 of FIG. 1 is inserted into the lens barrel BR10, the lens assemblies 110, 120, 130, and 140 of FIGS. 3 to 6 may be inserted into a predetermined lens barrel. In addition, the entirety of a structure illustrated in FIG. 7, that is, the entirety of a structure in which the lens assembly 100 is inserted into the lens barrel BR10, may be regarded as a "lens assembly" or an "optical system". In addition, the structure of the lens assembly 100 or the structure in which the lens assembly 100 is inserted into the lens barrel BR10 may be applied to an optical system such as a camera.

While the present invention has been particularly shown and described with reference to exemplary embodiments thereof using specific terms, the embodiments and terms have been used to explain the present invention and should not be construed as limiting the scope of the present invention defined by the claims. For example, the shapes of lenses, a groove region, and an insertion region of a lens assembly may be modified in various ways, and the number of lenses to be used may be modified in various ways. In addition, the shape of a light blocking member and a structure of a lens barrel may be modified in various ways. Therefore, the scope of the invention is defined not by the detailed description of the invention but by the appended claims, and all differences within the scope will be construed as being included in the present invention.

What is claimed is:

1. An optical system that comprises a lens assembly comprising at least two lenses, the lens assembly comprising:
    a first lens having a groove region;
    a second lens having an insertion region that is inserted into the groove region; and
    a light blocking member that is disposed between the first lens and the second lens and has an opening corresponding to an optical axis of the lens assembly,
    wherein the light blocking member is disposed between a first surface portion of the first lens and a second surface portion of the second lens, and the light blocking member is separated from at least one of the first surface portion and the second surface portion,
    wherein the groove region is formed in an annular shape in an outer circumferential portion of the first lens and the insertion region has an annular shape corresponding to the groove region,
    wherein the first lens has the first surface portion on an inner side with respect to the groove region, and the second lens has the second surface portion on an inner side with respect to the insertion region, and
    wherein an outer diameter of the light blocking member corresponds to an inner diameter of the insertion region.

2. The optical system of claim 1, wherein an inner side surface of the groove region and an outer side surface of the insertion region are parallel to the optical axis.

3. The optical system of claim 1, wherein an end surface of the insertion region comes into close contact with a bottom of the groove region.

4. The optical system of claim 1, wherein the lens assembly further comprises a third lens coupled to the first lens or the second lens.

5. The optical system of claim 4, wherein the first lens or the second lens comprises a second groove region, and the third lens comprises a second insertion region that is inserted into the second groove region.

6. The optical system of claim 4, wherein the third lens comprises a second groove region, and the first lens or the second lens comprises a second insertion region that is inserted into the second groove region.

7. The optical system of claim 4, wherein the lens assembly further comprises a second light blocking member that is disposed between the third lens and one of the first and second lenses.

8. The optical system of claim 7, wherein the second light blocking member is disposed between a third surface portion of one of the first and second lenses and a fourth surface portion of the third lens, and the second light blocking member is separated from at least one of the third and fourth surface portions.

9. The optical system of claim 4, wherein the lens assembly further comprises at least one other lens.

10. The optical system of claim 1, wherein the entirety of at least one of both surfaces of the light blocking member is separated from the first surface portion and the second surface portion.

11. An optical system that comprises a lens assembly comprising at least two lenses, the lens assembly comprising:
    a first lens having a groove region;
    a second lens having an insertion region that is inserted into the groove region; and
    a light blocking member that is disposed between the first lens and the second lens and has an opening corresponding to an optical axis of the lens assembly,
    wherein the light blocking member is disposed between a first surface portion of the first lens and a second surface portion of the second lens, and the light blocking member is separated from at least one of the first surface portion and the second surface portion, and
    wherein the groove region is a first groove region, the first lens further comprises a second groove region, and the light blocking member is disposed in the second groove region.

12. The optical system of claim 11, wherein an outer diameter of the second groove region is smaller than an outer diameter of the first groove region.

13. An optical system that comprises a lens assembly comprising at least two lenses, the lens assembly comprising:
    a first lens having a groove region;
    a second lens having an insertion region that is inserted into the groove region; and
    a light blocking member that is disposed between the first lens and the second lens and has an opening corresponding to an optical axis of the lens assembly,
    wherein the light blocking member is disposed between a first surface portion of the first lens and a second surface portion of the second lens, and the light blocking member is separated from at least one of the first surface portion and the second surface portion,
    wherein the groove region is a first groove region, the first lens further comprises a second groove region within the first groove region, and the light blocking member is disposed in the second groove region, and
    wherein the second lens further comprises a protrusion portion that is inserted into the second groove region.

14. The optical system of claim 13, wherein an outer diameter of the first lens is greater than an outer diameter of the second lens, and
    wherein the entirety of the outer side surface of the second lens is surrounded by the first lens.

15. An optical system that comprises a lens assembly comprising at least two lenses, the lens assembly comprising:
- a first lens having a groove region;
- a second lens having an insertion region that is inserted into the groove region; and
- a light blocking member that is disposed between the first lens and the second lens and has an opening corresponding to on an optical axis,
- wherein the groove region has a first surface portion that is perpendicular to the optical axis, and the insertion region has a second surface portion that is perpendicular to the optical axis,
- wherein an inner side surface of the groove region has a first inclined surface that is inclined with respect to the optical axis,
- wherein an outer side surface of the insertion region has a second inclined surface contacting the first inclined surface,
- wherein the light blocking member is located between the first surface portion of the groove region and the second surface portion of the insertion region,
- wherein the first and second inclined surfaces are spaced apart from the first surface portion, and the light blocking member is not overlapped with the first and second inclined surfaces in a direction perpendicular to the optical axis.

16. The optical system of claim 15, wherein an interval between the groove region and the insertion region is greater than a thickness of the light blocking member.

* * * * *